(12) United States Patent
Zidel (10) Patent No.: US 6,330,436 B1
(45) Date of Patent: Dec. 11, 2001

(54) ENHANCED WIRELESS MESSAGING NOTIFICATION SYSTEM

(75) Inventor: Andrew T. Zidel, Westfield, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/302,362

(22) Filed: Apr. 30, 1999

(51) Int. Cl.[7] .................................................. H04M 11/10
(52) U.S. Cl. ............................ 455/412; 455/90; 455/575; 455/573
(58) Field of Search ............................. 455/90, 575, 573, 455/572, 557, 88, 412

(56) References Cited

U.S. PATENT DOCUMENTS 5,797,094 * 8/1998 Houde ................................... 455/412
5,940,767 * 8/1999 Bourgeois ............................. 455/466

* cited by examiner

Primary Examiner—Vivian Chang
Assistant Examiner—James K Moore (57) ABSTRACT

A wireless message notification system includes a message processing unit which also serves as a battery recharger for a portable wireless device. The message processing unit includes a receiver for receiving a wireless data message sent by a central service facility and a docking station. While the wireless device is recharging in the docking station, the message processing unit compares the messages that it has received from the central service facility against the messages received by the wireless device. If the message processing unit has received additional messages, the additional messages are downloaded to the wireless device for the user to review.

19 Claims, 5 Drawing Sheets

ENHANCED WIRELESS MESSAGING NOTIFICATION SYSTEM

BACKGROUND OF THE INVENTION

1. Field of the Invention

The present invention relates to a message processing system and method for notifying a portable wireless device of incoming data messages. More particularly, the present invention relates to a system and method by which the chances of a portable wireless device receiving a data message are improved.

2. Description of the Background Art

Many portable wireless devices receive data messages from a central service facility. For example, a paging service facility transmits a phone number page, or a text message page, to a wireless pager. Many cellular service facilities offer pager-like services for cellular phones, wherein the cellular phone can receive a phone number page, a text message page, or a voice page.

Another example of a data message receiving system in the cellular phone environment concerns a voice mail service. When a caller attempts to call a cellular phone, and that phone is out of range, unpowered (either turned off or has a dead battery), or the user fails to answer the phone's rings, a central service facility will direct the caller into a voice mailbox. Later, the central service facility will transmit a "message waiting" type data message to the phone. A display on the phone will indicate to the phone's user that voice mail is waiting in the voice mailbox and perhaps other data such as the date and time of the voice mail, length of the message, whether the voice mail is urgent or normal, the caller ID data, etc.

Another example of a data message receiving system involves personal digital assistants. These devices are small computers which offer a variety of features including schedule planning, data processing, and wireless communication functions in a portable unit. Often, these personal assistants receive data messages, such as phone number pages, text pages, voice mail "message waiting" indications, "e-mail waiting" notifications, stock market updates, etc.

The message notification systems described above can be divided into one of two classes, namely a one-way message notification system or a two-way message notification system. In a one-way message notification system, the data message is transmitted from the central service facility and not acknowledged by the wireless device. In other words, the service facility has no way of knowing whether or not the wireless device received the data message. In a one-way notification system, the service facility typically repeats the data message a number of times to increase the likelihood that the wireless device received the data message. In a two-way message notification system, the wireless device transmits an acknowledgement signal back to the service facility once the data message is received. The service facility then ceases to retransmit the data message.

Both systems suffer drawbacks. In the one-way system, the service facility establishes a limit on the number of times a data message will be retransmitted. After the limited number of retransmissions, the data message is stored in a buffer allocated to the user at the service facility. If the wireless device had failed to receive the data message during the limited number of retransmissions, the user can only learn of the data message's existence and content by periodically contacting the service facility and checking for missed data messages.

Eventually, the service facility will erase a user's data messages after an extended period of time, or allow the overwriting of older data messages in a user's allocated buffer as newer messages are stored therein. Thus, it is possible for an unreviewed data message to be completely lost when a user fails to check for missed, data messages over an extended period of time, such as during a vacation.

In the two-way system, if a wireless device does not acknowledge receipt of a data message, the service facility will wait a predetermined time, for instance one-half hour, and retransmit the data message. This retransmission procedure may occur several times. If no acknowledgement signal is forthcoming from the wireless device after several retransmissions, such as three to four, the service facility will store the data message in a buffer allocated to the user. Later, if the wireless device reestablishes contact with the service facility, such as by entering a zone of coverage, the service facility will check the buffer for data messages and, if any are present, will transmit these data messages to the wireless device.

Again, the two-way system suffers drawbacks associated with the buffering system. The service facility typically limits the buffer size per user. For example, some networks limit storage to three packets of data per user (with 512 bytes of data equaling one packet). If a user's wireless device is out of range, or unpowered, for an extended period of time and that user happens to receive many packets of data, the older packets of data will be overwritten in the buffer and lost.

Another problem with the two-way system occurs when the wireless device receives the data message but its acknowledgement signal is too weak to reach the service facility. In this instance, the service facility will retransmit the data message the maximum number of times before storing the data message in the service facility's buffer. Here, however, the wireless device has received each of the retransmissions. If the user is not alert to the situation, and the user is not deleting the duplicative data messages, each retransmission will be stored in the wireless device's memory. These duplicative data messages may overwrite older data messages. Sometimes the user has not yet reviewed the older data messages, or perhaps the user was retaining the older data messages for later referral.

One attempt, in the background art, to rectify these drawbacks has been proposed by Motorola, Inc. Motorola, Inc. offers a two-way cellular phone with a built in one-way pager. If the phone is off, the pager remains on and is intended to receive any data messages. Later, when the phone is turned on, the pager will communicate the received data messages to the phone. This solution also suffers the drawbacks associated with the one-way wireless devices discussed above. Namely, if the battery power of the phone-pager combination is depleted, the pager will be unable to receive any of the data messages. Further, if the phone-pager combination is out of range, the pager will simply not receive the data messages. Either event can lead to an overrun of data messages in the central facility's buffer and a loss of important data messages.

Therefore, there exists a need in the art for a message notification system which improves the chances of a portable wireless device gaining notification of a data message. Further, there exists a need in the art for a message notification system, which eases the processing overhead on the central service facility in retransmitting data messages.

SUMMARY OF THE INVENTION

The present invention provides a wireless message notification system for supplementing the operation of a wireless device, intended to receive data messages sent by a central service facility. The message notification system includes a message processing unit having a docking station and a receiver for receiving data messages. When the wireless device is docked in the docking station, the message processing unit compares the data messages that it has received against the data messages received by the wireless device. If the message processing unit has received additional messages, the additional messages are downloaded to the wireless device for review.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
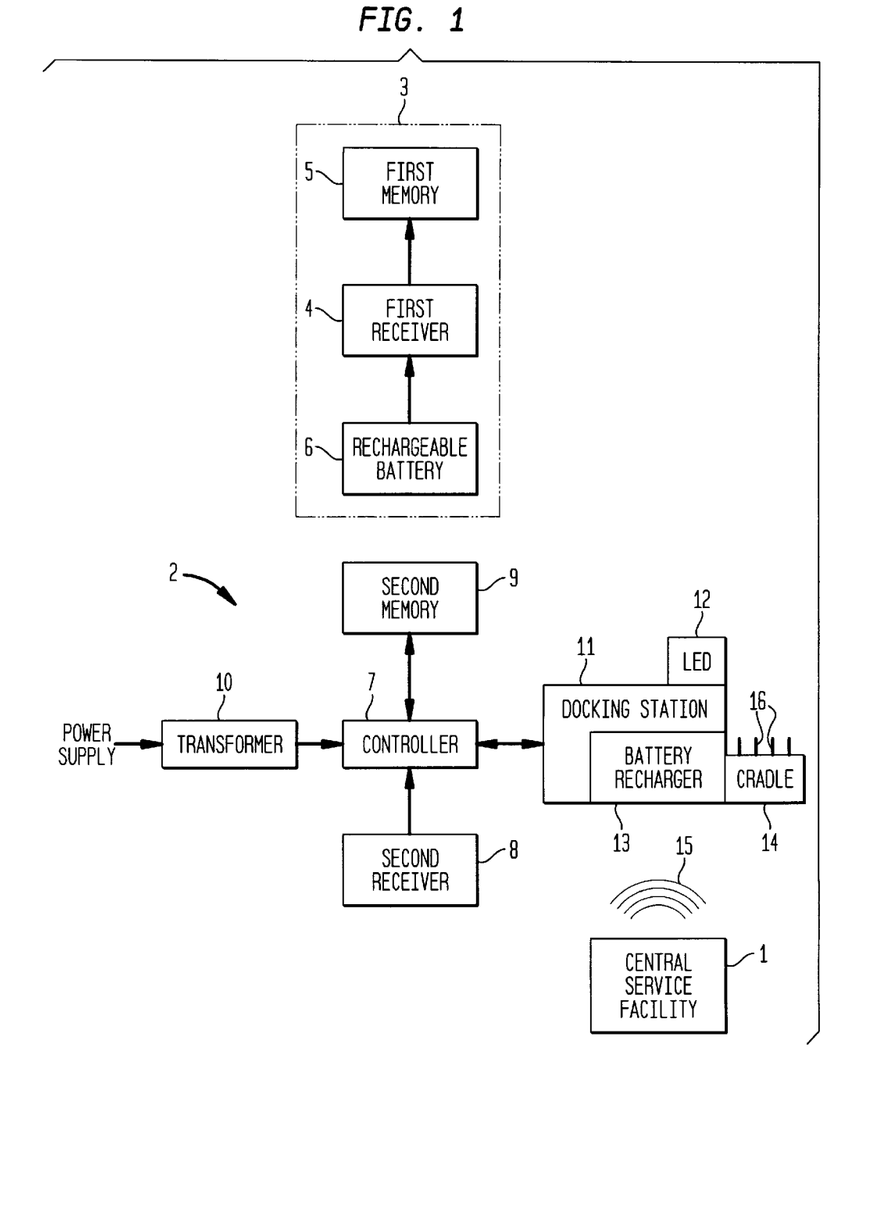
FIG. 1 is block diagram of a one-way message notification system, in accordance with the present invention.

Referring in detail to the drawings and with particular reference to FIG. 1, an one-way message notification system, in accordance with the present invention, includes a central service facility 1, a one-way message processing unit 2, and a portable wireless device 3. The wireless device 3 includes a first receiver 4, a first memory 5 and a power supply, such as a rechargeable battery 6. The message processing unit 2 includes a controller 7. The controller 7 is electrically connected to a second receiver 8, a second memory 9, a transformer 10, and a docking station 11. The docking station 11 includes a battery recharger 13 and a cradle 14.

The message processing unit 2 replaces the common battery-recharging unit associated with typical portable wireless devices. The message processing unit 2 would still be capable of recharging the battery 6 of the wireless device 3, but would also include a one-way message notification system, in accordance with the present invention.

The message notification system of the present invention operates as follows. The central service facility 1 transmits a first wireless data message 15, such as a phone number page, a text page, a voice page, a "message waiting" indication, an "e-mail waiting" indication, etc. If the first receiver 4 receives the data message 15, the user will be able to review and process the data message 15 appropriately. If the first receiver 4 is unable to receive the data message 15, due to an insufficient power level in the battery 6, the wireless device 3 being turned off, or the wireless device 3 being out of range, the operator will be unaware of the existence of the data message 15.

Meanwhile, the transformer unit 10 of the message processing unit 2 is electrically connected to a stable power supply, such as a wall outlet or a vehicle's cigarette lighter port. Typically, the message processing unit 2 would be located in places such as the user's home, office, hotel room, or vehicle. When the central service facility 1 transmits the data message 15, the second receiver 8 would also have an opportunity to receive the data message 15. The chance that the second receiver 8 will receive the data message 15 is relatively greater since:

1) The power supply connected to the transformer 10 is constant and not subject to dropping to an insufficient level, as is the rechargeable battery 6 of the wireless device 3;

2) The message processing unit 2 can be placed in its powered, "on", state constantly since there is no danger of depleting its power source as is the case with the battery 6 of the wireless device 3; and 3) The fixed location of the message processing unit 2 is more likely to be in the range of the central service facility 1, since the portable wireless device 3 might be passing through a dark zone of the coverage area during the transmission of the data message 15, or simply might be located outside the coverage area of the central service facility 1.

Once the second receiver 8 receives the data message 15, the controller 7 stores the data message 15 in the second memory 9. Since FIG. 1 illustrates a one-way message notification system, the central service facility 1 will retransmit the data message 15 several more times. When the retransmitted data message is received by the second receiver 8, the controller 7 compares the data message to the data messages previously stored in the second memory 9. If the newly received data message matches a stored data message, it is ignored and not stored in the second memory 9. If the newly received data message is unique, as compared to data messages stored in the second memory 9, it is stored in the second memory 9.

Figure 2:
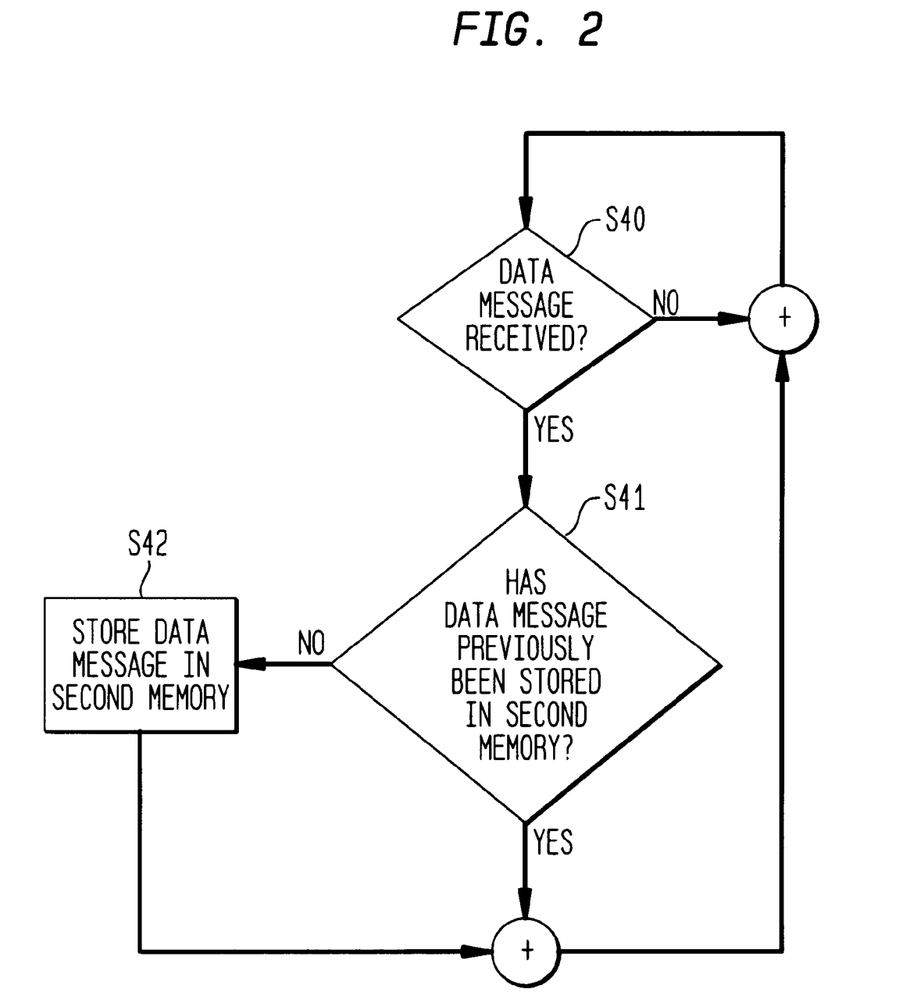
FIG. 2 is a flow chart illustrating a method of operation of the messaging notification system of FIG. 1.

This method of operation is illustrated in the flow chart of FIG. 2. In step S40, the message processing unit 2 waits to receive a data message. Once a data message is received, in step S41, the controller 7 compares that data message to any and all data messages stored in the second memory 9. If the received data message is not presently stored in the second memory 9, in step S42, the data message is stored in the second memory 9; and the message processing unit 2 returns to a state of waiting for an incoming data message. If the data message was previously stored in the second memory 9, the data message is ignored and the message processing unit 2 returns to step S40.

One method of comparing the data messages in step S41 would be for the central service facility 1 to assign identification tags to each data message sent. A retransmission of a previous data message would have the same identification tag, whereas a new data message would have a new identification tag. By this scheme, the controller 7 would also store the identification tag of a data message along with the data message itself. When a new data message was received, the controller 7 need only compare the new data message's identification tag to the identification tags of the previously stored data messages.

Another method would be to compare the entire data within a newly received data message to the entire data of the previously stored data messages. If the newly received data massage did not match any of the previously stored data messages, the newly received data message would be stored in the second memory 9 in step S42. One could also compare only select portions of the data messages, such as every sixteenth bit of data, and be reasonably assured of whether or not the received data message was a retransmission or a new data message.

Alternatively, if the central service facility 1 is aware that the wireless device 3 has the message processing unit 2 of the present invention supplementing its operation, the central service facility 1 could assume that all data messages are received by either or both of the first receiver 4 and the second receiver 8. In this case, retransmissions of data messages would no longer occur. The central service facility 1 would have its processing overhead reduced, while the assurance that the data message has been received has been increased.

Figure 3:
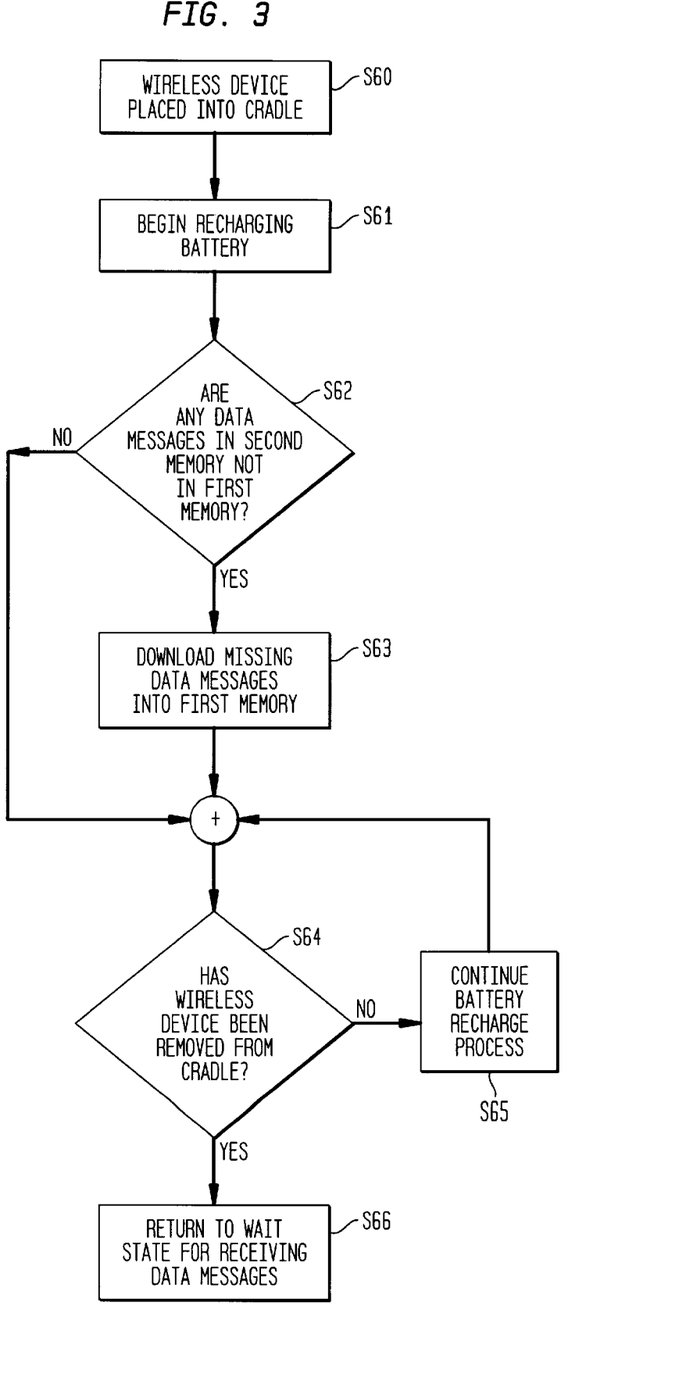
FIG. 3 is a flow chart illustrating a docking operation between the wireless device and the messaging notification system of FIG. 1.

FIG. 3 is a flowchart illustrating a docking procedure between the wireless device 3 and the message processing unit 2. When the user returns the their home, office, hotel room, vehicle, etc., the user docks the wireless device 3 into the cradle 14 of the docking station 11 (step S60). Once docked, the battery recharger 13 would begin to recharge the battery 6 of the wireless device 3 via contact pins 16 located in the cradle 14 (step S61).

Also, via the contact pins 16, the controller 7 would access the first memory 5 within the wireless device 3. The first memory 5 contains the data messages received by the first receiver 4. In step S62, the controller 7 compares the data messages in the first memory 5 with the data messages stored in the second memory 9. In step S63, any data messages not stored in the first memory 5 are downloaded into the first memory 5 from the second memory 9.

In step S64, the controller 7 senses whether or not the user has removed the wireless device 3 from the cradle 14. If the wireless device 3 remains in the cradle 14, the battery recharging process continues in step S65. Once the wireless device 3 has been removed, in step S66, the message processing unit 2 returns to the wait state of FIG. 2. Of course, it would be possible to have the wait state of FIG. 2 continuously ongoing regardless of whether or not the wireless device 3 is in or out of the cradle 14. By the above arrangement, the user can retrieve any data messages, via the wireless device 3, missed by the first receiver 4, but received by the second receiver 8.

There are several various methods by which step S62 can be completed. In one method, the entire data, or portions of the data, comprising the data messages stored in the second memory 9 are compared to the entire data, or portions of the data, comprising the data messages stored in the first memory 5 to determined which data messages need to be downloaded. In a second method, if the data messages have been assigned identification tags, the controller 7 need only compare the identification tags stored in the second memory 9 to the identification tags stored in the first memory 5 to determine which data messages need to be downloaded.

One particular benefit of the second method involving the identification tags is that the user may have deleted data messages received by the first receiver 8 prior to docking the wireless device 3 into the cradle 14. Under this circumstance, it is undesirable to download the deleted data messages, since these data messages have already been reviewed by the user. Here, the first memory 5 will have a partitioned area for sequentially storing a predetermined number of identification tags associated with the last sequentially received data messages, in a first-in-first-out organization. When the user deletes a data message, its identification tag remains in the partitioned area until displaced by the later receptions of the predetermined number of data messages. By this arrangement, the controller 7 can download only those messages not received by the first receiver 4, regardless of whether or not the data message has subsequently been deleted from the first memory 5.

If the central service facility 1 does not include identification tags with the data messages, it is still possible to construct formulated tags. When the first receiver 4 receives the data message, certain portions of the data comprising the data message can be subjected to an algorithm and stored in the partitioned area of the first memory 5. Correspondingly, when the controller 7 stores a received data message in the second memory 9, the controller 7 can construct and store a formulated tag constructed under the same algorithm. In step S62, the controller 7 would then compare the formulated tags in the second memory 9 to the formulated tags in the partitioned area of the first memory 5 to determined which data messages need to be downloaded.

Figure 4:
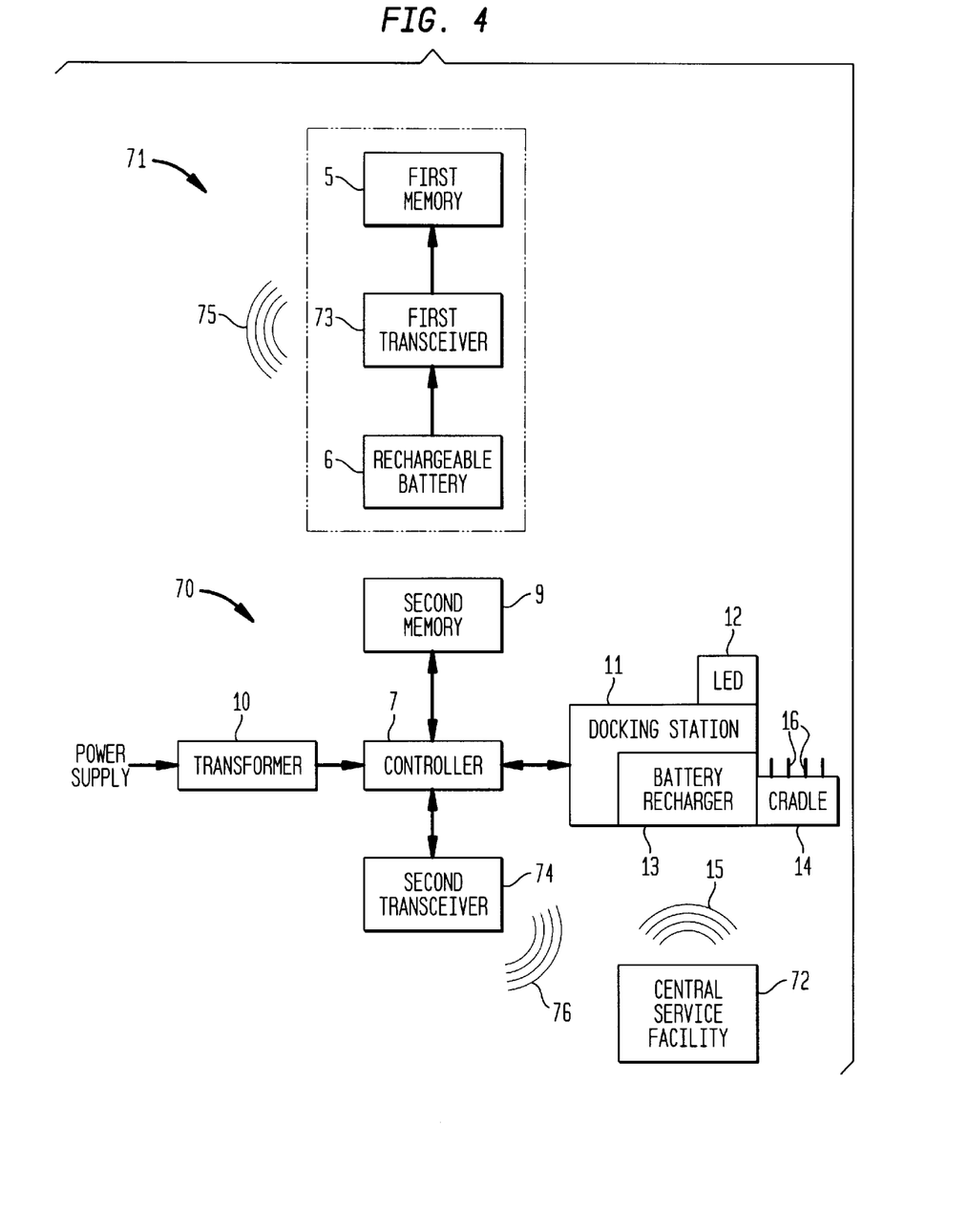
FIG. 4 is block diagram of a two-way message notification system, in accordance with the present invention.
Figure 5:
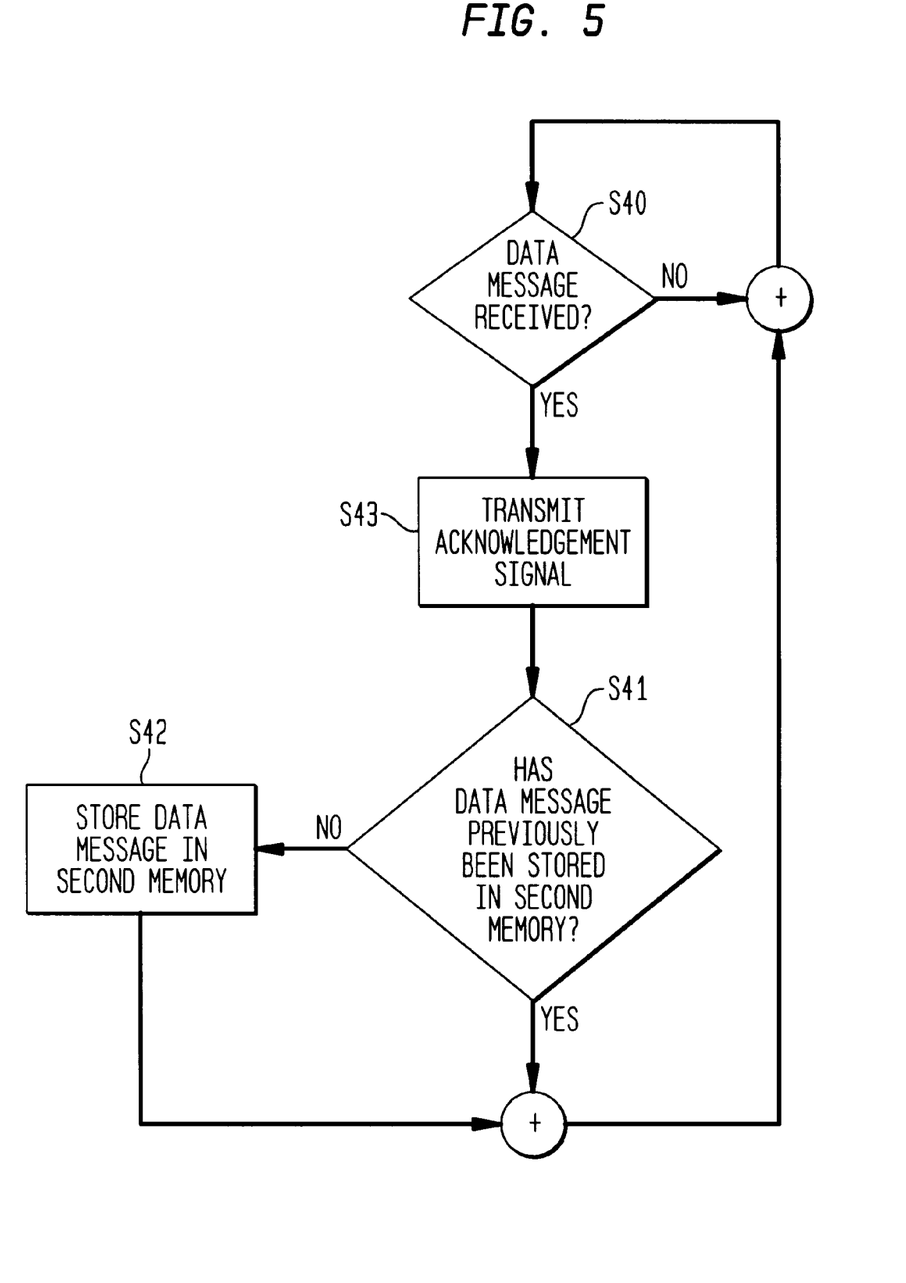
FIG. 5 is a flow chart illustrating a method of operation of the messaging notification system of FIG. 4.

FIGS. 4 and 5 illustrate a second embodiment of the present invention wherein the message processing unit 70 and the wireless device 71 operate in a two-way manner with the central service facility 72. Like reference numerals have been used to indicate like components and method steps. The primary difference in the components of the second embodiment is the replacement of the first receiver 4 with a first transceiver 73 and the replacement of the second receiver 8 with a second transceiver 74.

When the central service facility 72 transmits a data message 15, the first transceiver 73 responds with a first acknowledgement signal 75. Receipt of the first acknowledgement signal 75 by the central service facility 72 assures the central service facility 72 that the data message 15 has been received. Therefore, no further retransmissions of the data message 15 occur.

The message processing unit 70 can also acknowledge receipt of the data message 15 by a second acknowledgement signal 76. The second acknowledgement signal 76 is identical to the first acknowledgement signal 75. By this arrangement, if the first transceiver 73 is unable to receive the data message 15 (e.g. battery 6 is dead, the wireless device 71 is out of range or turned off), the message processing unit 70 can receive and acknowledge the data message, via the second transceiver 74, and spare the central service facility 72 the overhead of later retransmissions of the data message 15.

Also, under the circumstance that the first transceiver 73 does receive the data message 15, but the first transceiver 73 lacks the power, or signal strength, to return the acknowledgement signal 75 to the central service facility 72, the central service facility 72 will receive the second acknowledgement signal 76 from the second transceiver 74. Under this circumstance, the central service facility 72 is spared the overhead of retransmissions, and the wireless device 71 is spared the possibly of overwriting stored data messages in the first memory 5, since the first transceiver 73 will not be subjected to multiple retransmissions of the same data message.

The method of operation of the message processing unit 70 is illustrated in the flow chart of FIG. 5. In step S40, message processing unit 70 waits to receive a data message. Once a data message is received, in step S43, the second transceiver 74 transmits the second acknowledgement signal 76. The processing then passes to step S41 and proceeds in accordance with the method discussed in relation to FIG. 2, described above. The docking procedure between wireless device 71 and the message processing unit 70 is identical to the docking procedure illustrated in FIG. 3, described above.

By the present invention, there is disclosed a system and method by which a wireless device user can receive data messages in a more assured manner. The message processing unit 2, 70 is a relatively cheap component to manufacture. It can be incorporated into the same housing as the, already necessary, battery recharger 13. Further, the components of the message processing unit 2, 70 need not be as compact, light weight, or power efficient as the components used in the wireless device, 3, 71 since the message processing unit 2, 70 is not portable and does not operate off of a limited-capacity, rechargeable battery 6. Further, the message processing unit 2, 70 need not include expensive components associated with displaying or playing the data messages, as does the wireless unit 3, 71.

The present invention is subject to many variations without departing from the spirit and scope of the appended claims. For example, the message processing unit 2, 70 can include an LED 12 for indicating the presence of data message stored in the second memory 9 which may be new to the wireless device 3, 71. The cradle 14 may be replaced by an electrical plug for connection with mating contacts of the wireless unit 3, 71. Also, the communication between the message processing unit 2, 70 and the wireless device 3, 71 need not be hardwired. It is also in the province of the present invention that such communications could occur via an inductive coupling, an optical link, a wireless radio link, or any other known form of communication.

In the case of the embodiment illustrated in FIGS. 4 and 5, it would be particularly advantageous to have the data message communication occur via a wireless link, since the message processing unit 70 already has the second transceiver 74. In this case, no electrical contacts need be included on the wireless device 71 for contacting the contact pins 16 of the cradle 14, other than those associated with recharging of the battery 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A message processing unit comprising:
    a portable wireless unit including a first receiver for receiving wireless data messages;
    a docking station including a second receiver for receiving wireless data messages; and
    a controller for determining if a wireless data message was received by said second receiver but not received by said first receiver, wherein said docking station includes a transmitter to communicate a message signal to said portable wireless unit, wherein said message signal includes the wireless data message which was received by said second receiver but not received by said first receiver.

2. The message processing unit according to claim 1, wherein said transmitter also transmits a wireless acknowledgement message, when said second receiver receives a wireless data message.

3. The message processing unit according to claim 1, wherein said message signal is sent to said portable wireless unit as a wireless message signal.

4. The message processing unit according to claim 1, further comprising:
    at least one terminal within said docking station, and wherein said transmitter communicates said message signal, for the portable wireless unit, via said at least one terminal.

5. The message processing unit according to claim 4, wherein said at least one terminal includes an electrical contact, an optical cell, or an inductive coil.

6. The message processing unit according to claim 4, wherein said at least one terminal also supplies power for recharging a power supply of the portable wireless unit.

7. The message processing unit according to claim 1, further comprising:
    a DC cigarette lighter adapter for powering said message processing unit.

8. A communication system comprising:
    a central facility for transmitting wireless data messages;
    a portable wireless unit including a first receiver for receiving wireless data messages;
    a docking station including a second receiver for receiving wireless data messages; and
    a controller for determining if a wireless data message was received by said second receiver but not received by said first receiver, wherein said docking station includes a transmitter to communicate a message signal to said portable wireless unit, wherein said message signal includes the wireless data message which was received by said second receiver but not received by said first receiver.

9. The communications system according to claim 8, wherein said transmitter transmits a wireless acknowledgement message to said central facility, when said second receiver receives a wireless data message.

10. The communications system according to claim 8, further comprising:
    at least one terminal within said docking station, and wherein said transmitter communicates said message signal to said portable wireless unit, via said at least one terminal.

11. The communications system according to claim 10, further comprising:
    a rechargeable power supply associated with said portable wireless unit, wherein said at least one terminal also supplies power for recharging said rechargeable power supply.

12. The communications system according to claim 8, wherein said portable wireless unit is a wireless phone.

13. The communications system according to claim 8, wherein said portable wireless unit is a pager.

14. The communications system according to claim 8, wherein said portable wireless unit is a portable computer.

15. A method of operating a communication system, comprising the steps of:
    providing a central facility for transmitting wireless data messages; a portable wireless unit including a first receiver for receiving the wireless data messages, and a docking station including a second receiver for receiving the wireless data messages;
    transmitting a first wireless data message from the central facility;
    receiving the first wireless data message at the second receiver;
    docking the portable wireless unit in the docking station; and
    determining if the first wireless data message, received by the second receiver, was received by the first receiver, and if not received by the first receiver, the docking station communicating a message signal, relating to the first wireless data message, to the portable wireless unit.

16. The method according to claim 15, further comprising the steps of:
    providing a transmitter in the docking station; and
    acknowledging receipt of the first wireless data message, by the second receiver, by transmitting a wireless acknowledgement message from the transmitter.

17. The method according to claim 15, wherein the message signal is a repetition of the first wireless data message.

18. The method according to claim 15, wherein said step of docking includes the step of inserting the portable wireless unit into a cradle of the docking station.

19. The method according to claim 18, further comprising the steps of:
   providing a rechargeable power supply in the wireless portable unit; and
   recharging the power supply when the portable wireless unit is inserted into the cradle.

* * * * *